Figure 1:
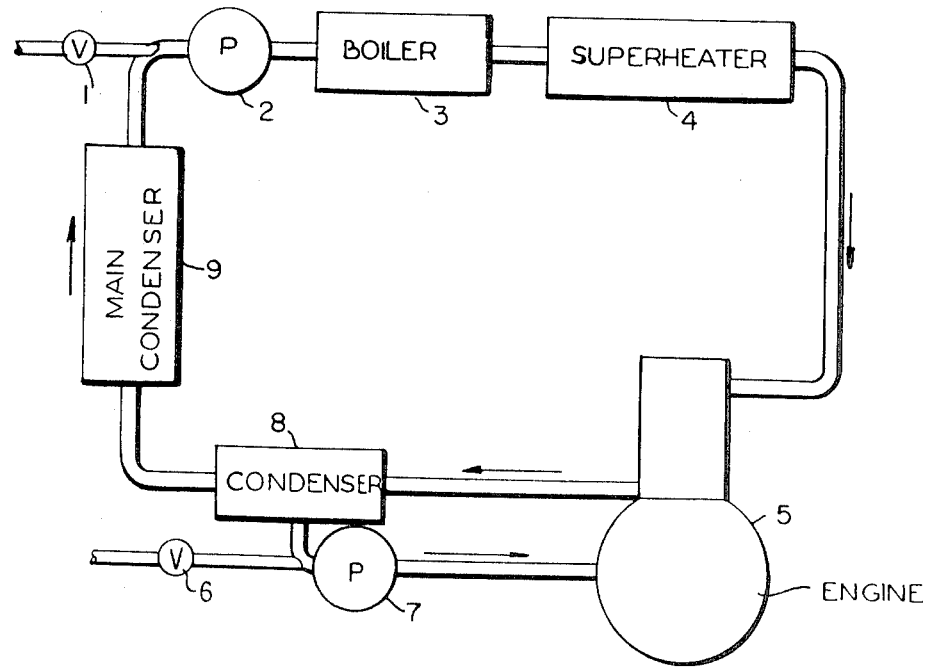

PATENTED JUN 15 1971                    3,584,457

INVENTOR
JOHN GORDON DAVOUD

BY  Howell & Howell

ATTORNEYS

United States Patent

[11] 3,584,457

[72] Inventor John Gordon Davoud
 Richmond, Va.
[21] Appl. No. 829,590
[22] Filed June 2, 1969
[45] Patented June 15, 1971
[73] Assignee Edwin Cox Associates
 Richmond, Va.

[54] EXTERNAL COMBUSTION POWER GENERATING SYSTEM
 12 Claims, 2 Drawing Figs.
[52] U.S. Cl. .................................................. 60/36,
 60/104, 184/1E
[51] Int. Cl. ................................................. F01k 25/06,
 F01b 31/10
[50] Field of Search........................................... 60/36, 104;
 184/1 E, 6 L; 92/154; 91/46

[56] References Cited
 UNITED STATES PATENTS
 3,511,049 5/1970 Norton et al.................. 60/36
 3,061,733 10/1962 Humpal........................ 60/36X
 3,292,366 12/1966 Rice et al...................... 60/36
 3,462,951 8/1969 Moore.......................... 60/36X Primary Examiner—Martin P. Schwadron
Assistant Examiner—Allen M. Ostrager
Attorney—Stowell & Stowell ABSTRACT: Heat is converted into mechanical energy by introducing into an expansion engine superheated vapor of a thermally stable fluorine containing organic working fluid having a melting point below the lowest normal ambient temperature at the point of use and a boiling point at ambient atmospheric pressure in the range from about 70° C. to about 120° C. and a thermally stable fluorine containing organic lubricant fluid having a melting point below the lowest normal ambient temperature of the point of use and a boiling point at ambient atmospheric pressure substantially higher than the boiling point of the working fluid, condensing the exhaust vapors from the expansion engine, evaporating and superheating the condensed working fluid and returning the superheated vapor to the expansion engine. Lubricant fluid contained in the exhaust from the expansion engine may be separated prior to the condensation of the working fluid and returned to the engine directly or in admixture with the working fluid.

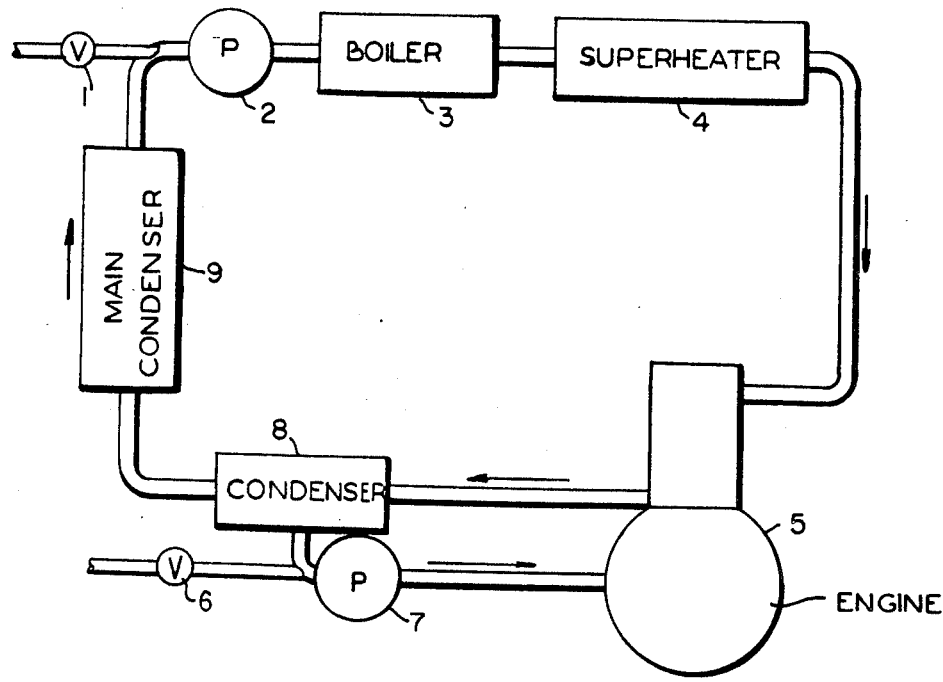

EXTERNAL COMBUSTION POWER GENERATING SYSTEM

The invention relates to a method of converting heat into mechanical energy at high efficiency by means of an external combustion closed cycle system. More particularly, the method of the invention is characterized by the utilization of the properties of fluorinated organic compounds in the conversion of heat into mechanical energy in an external combustion closed cycle power generating system.

The method of the invention broadly comprises evaporating and superheating a thermally stable fluorine containing organic working fluid having a melting point below the lowest normal ambient temperature at the point of use and a boiling point at ambient atmospheric pressure in the range from about 70° C. to about 120° C., introducing into an expansion engine the superheated vapor of the working fluid and a thermally stable fluorine containing organic lubricant fluid having a melting point below the lowest normal ambient temperature at the point of use and a boiling point at ambient atmospheric pressure substantially higher than the boiling point of the working fluid, condensing the exhaust vapors from the expansion engine, evaporating and superheating the condensed working fluid and returning the superheated vapor to the expansion engine. The lubricant fluid contained in the engine exhaust may be separated therefrom, for example, by partial condensation and returned to the engine either directly or in admixture with the working fluid vapor.

Other desirable characteristics of the working fluid include low molecular weight, large difference between the boiling point and the critical temperature, low flammability, low toxicity and chemical inertness under the conditions of use. Suitable working fluids include perfluoromethylcyclohexane ($C_7F_{14}$), perfluoro-n-heptane ($C_7F_{16}$) and 2,2,2-trifluoroethanol ($CF_3CH_2OH$).

The lubricant fluid should be fully compatible and miscible with the working fluid and chemically inert under the conditions of use. Useful lubricant fluids include normally liquid low molecular weight polymers of chlorotrifluoroethylene such as "Halocarbon 14-25" of Halocarbon Products Corporation or one of the "Fluorlube" lubricant oils of Hooker Chemical Corporation, which are linear polymers containing the recurring unit -$CF_2$-CFCl-. Other useful lubricating fluids are fully fluorinated linear polymers containing the recurring unit -$CF_2$-$CF_2$- and the perfluoralkyl polyethers sold by E. I. DuPont de Nemours & Company under the name "Krytox." The lubricant may be supplied separately to the engine or in admixture with the superheated working fluid.

Figure 2:
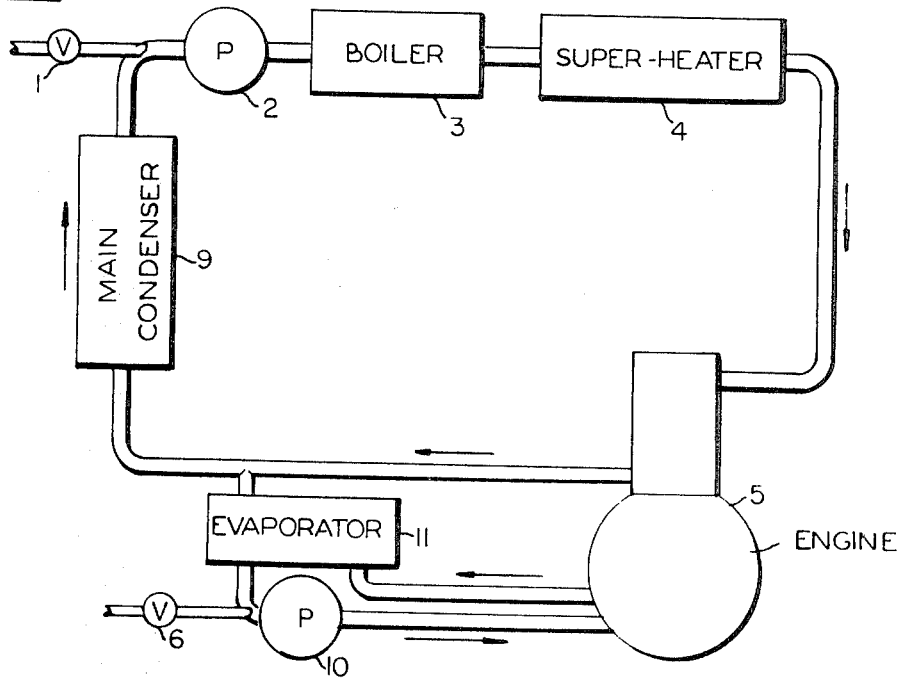

The principles of the invention will be further described with reference to the accompanying drawings in which:

FIG. 1 is a diagrammatic representation of a heat energy conversion system embodying the principles of the invention; and FIG. 2 is a diagrammatic representation of a modification of the heat energy conversion system of FIG. 1.

Like elements are designated by the same reference numerals in the figures of the drawing.

In the system illustrated in FIG. 1, the main working fluid, which may be introduced into the system or withdrawn therefrom through valve 1, is forced by pump 2 through boiler 3, wherein it is vaporized, and superheater 4 into expansion engine 5. Lubricant fluid is supplied to or withdrawn from the system through valve 6 and forced by pump 7 into the engine. Exhaust working fluid vapor from engine 5 carrying a minor portion of vaporized lubricant fluid passes through precondenser 8 wherein it is stripped of the major portion of its lubricant fluid content and then goes to main condenser 9 wherein it is condensed and returned to boiler 3 by pump 2.

Engine 5 may be a single-acting engine, or a double-acting engine of the uniflow type, having a cylindrical crosshead with a labyrinth seal between the piston and crosshead to minimize vapor loss from the working cylinder to the crankcase.

Because of complete compatibility of the working and lubricant fluids, the presence of minor amounts of working fluid in the liquid lubricant fluid or of lubricant fluid in the vaporized working fluid returned to the engine is immaterial to the efficient operation of the system.

In the method of operation illustrated in FIG. 2 of the drawing, exhaust working fluid vapor is passed directly from the engine to main condenser 9 while lubricant fluid from the engine crankcase is circulated by pump 10 through evaporator 11 wherein working fluid contained in the lubricant fluid is stripped from the lubricant fluid and returned to the main condenser 9.

In a further modification, a mixture of working fluid and lubricant is circulated through the system. Both are evaporated in the boiler but the lubricant fluid, having a substantially higher boiling point than the working fluid, will differentially condense in the coolest part of the cylinder. The condensate which is pumped by the piston and rings into the crankcase of the engine is handled as in FIG. 2 or pumped directly into the main boiler of the system.

I claim:

1. A method of converting heat into mechanical energy which comprises evaporating and superheating a thermally stable fluorine containing organic working fluid having a melting point below the lowest normal ambient temperature at the point of use and boiling point at ambient atmospheric pressure in the range from about 70° C. to about 120° C., introducing into an expansion engine the superheated vapor of the working fluid and a thermally stable fluorine containing organic lubricant fluid having a melting point below the lowest normal ambient temperature at the point of use and a boiling point at ambient atmospheric pressure substantially higher than the boiling point of the working fluid, condensing the exhaust vapors from the expansion engine, returning at least a portion of the lubricant fluid contained in the exhaust vapor to the engine, evaporating and superheating condensed working fluid and returning the superheated vapor to the expansion engine.

2. A method as defined in claim 1 wherein the working fluid is a polyfluorinated organic substance.

3. A method as defined in claim 1 wherein the working fluid is a perfluorohydrocarbon.

4. A method as defined in claim 1 wherein the working fluid is perfluoromethylcyclohexane.

5. A method as defined in claim 1 wherein the working fluid is perfluorodimethylcyclohexane.

6. A method as defined in claim 1 wherein the working fluid is perfluoroheptane.

7. A method as defined in claim 1 wherein the working fluid is 2,2,2-trifluoroethanol.

8. A method as defined in claim 1 wherein the lubricant fluid is a liquid polymer of chloro-trifluorethylene.

9. A method as defined in claim 1 wherein the lubricant fluid is a fully fluorinated hydrocarbon.

10. A method as defined in claim 1 wherein the lubricant fluid is a perfluoralkylpolyether.

11. A method as defined in claim 1 wherein a major portion of the lubricant fluid contained in the exhaust from the expansion engine is separated from the exhaust prior to the condensation of the working fluid.

12. A method as defined in claim 11 wherein the separated lubricant fluid is returned directly to the expansion engine.